(12) United States Patent
Fuller et al.

(10) Patent No.: US 9,459,615 B2
(45) Date of Patent: Oct. 4, 2016

(54) COMMUNICATION DEVICE DISPLAY VISUALIZATION TOOL FOR A HUMAN-MACHINE INTERFACE

(75) Inventors: Bruce Gordon Fuller, Edmonton (CA); Brian Alexander Wall, White Rock (CA); Kevin George Gordon, Vancouver (CA); Mark David Hobbs, Hartford, WI (US); Mohamed Salehmohamed, Surrey (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 2621 days.

(21) Appl. No.: 12/041,523

(22) Filed: Mar. 3, 2008

(65) Prior Publication Data

US 2009/0222734 A1 Sep. 3, 2009

(51) Int. Cl.
*G06F 3/14* (2006.01)
*G05B 19/409* (2006.01)

(52) U.S. Cl.
CPC ... *G05B 19/409* (2013.01); *G05B 2219/36159* (2013.01); *G06F 3/14* (2013.01); *G09G 2370/04* (2013.01)

(58) Field of Classification Search
CPC .......................................................... G06F 3/14

USPC .......................................................... 715/736
See application file for complete search history.

(56) References Cited

U.S. PATENT DOCUMENTS

| 7,434,166 | B2 * | 10/2008 | Acharya et al. | 715/740 |
| 2005/0036509 | A1 * | 2/2005 | Acharya et al. | 370/466 |
| 2008/0101466 | A1 * | 5/2008 | Swenson et al. | 375/240.07 |
| 2009/0221307 | A1 * | 9/2009 | Wolak et al. | 455/466 |

\* cited by examiner

*Primary Examiner* — Sara England

(57) ABSTRACT

A Human-Machine Interface (HMI) system provides graphical displays to communication devices. The HMI system processes status data from machine systems to generate display data for the graphical displays. The HMI system receives selection information indicating one of the communication devices and one of the graphical displays. In response, the HMI system retrieves display parameters for the selected communication device and retrieves the display data for the selected graphical display. The HMI system processes the display data and the display parameters to display a first model of the selected communication device rendering the selected graphical display. The HMI system allows the user to modify the graphical display and view a second model of the communication device rendering the modified graphical display.

25 Claims, 9 Drawing Sheets

COMMUNICATION DEVICE DISPLAY VISUALIZATION TOOL FOR A HUMAN-MACHINE INTERFACE

TECHNICAL FIELD

The invention is related to the field of human-machine interfaces, and in particular, to a system that allows a user to view a model of a user-selected graphical display as rendered by a user-selected communication device operating over a user-selected communication network.

TECHNICAL BACKGROUND

Industrial environments include automobile manufacturing factories, food processing plants, and microprocessor fabrication facilities. The typical industrial environment includes various machines, such as pumps, motors, and robots. These machines continually produce data that indicates the current status of the machines, such as the machine's pressure, temperature, or speed.

The typical industrial environment also includes a Human-Machine Interface (HMI). The HMI receives and processes the status data from the machines to generate various graphical displays. The graphical displays indicate the current and historical status of the machines. For example, an HMI graphical display might indicate the pressure of a pump, the speed of a motor, or the output of a robot. The HMI may also control the machines. For example, the HMI might turn on a pump, speed-up a motor, or stop a robot.

The HMI may allow a user to remotely access a graphical display. The user operates a communication device to retrieve a graphical display from the HMI over a communication network. There are a vast number of potential HMI displays, communication networks, and communication devices. It is nearly impossible for the user to design an HMI graphical display that is suitable for each specific combination of display, device, and network.

TECHNICAL SUMMARY

A Human-Machine Interface (HMI) system provides graphical displays to communication devices. The HMI system processes status data from machine systems to generate display data for the graphical displays. The HMI system receives selection information indicating one of the communication devices and one of the graphical displays, and in response, retrieves display parameters for the selected communication device and retrieves the display data for the selected graphical display. The HMI system processes the display data and the display parameters to display a first model of the selected communication device rendering the selected graphical display.

In some embodiments, the HMI system receives a display modification characteristic, and in response, modifies the display data based on the display modification characteristic. The HMI system processes the modified display data and the display parameters to display a second model of the selected communication device rendering the selected graphical display as modified by the display modification characteristic. The HMI system saves the display modification characteristic in association with the selected graphical display and the selected communication device. The HMI system receives a request for the selected graphical display from the selected communication device, and in response, retrieves the display data for the selected graphical display, modifies the display data based on the display modification characteristic, and transfers the modified display data to the selected communication device. The selected communication device processes the modified display data to render the selected graphical display as modified by the display modification characteristic.

In some embodiments, the HMI system provides the graphical displays to the communication devices over a plurality of communication networks. The HMI system receives additional selection information indicating one of the communication networks, and in response, retrieves communication parameters for the selected communication network and processes the communication parameters to display the first model of the selected communication device operating over the selected communication network to render the selected graphical display.

DETAILED DESCRIPTION

Figure 1:
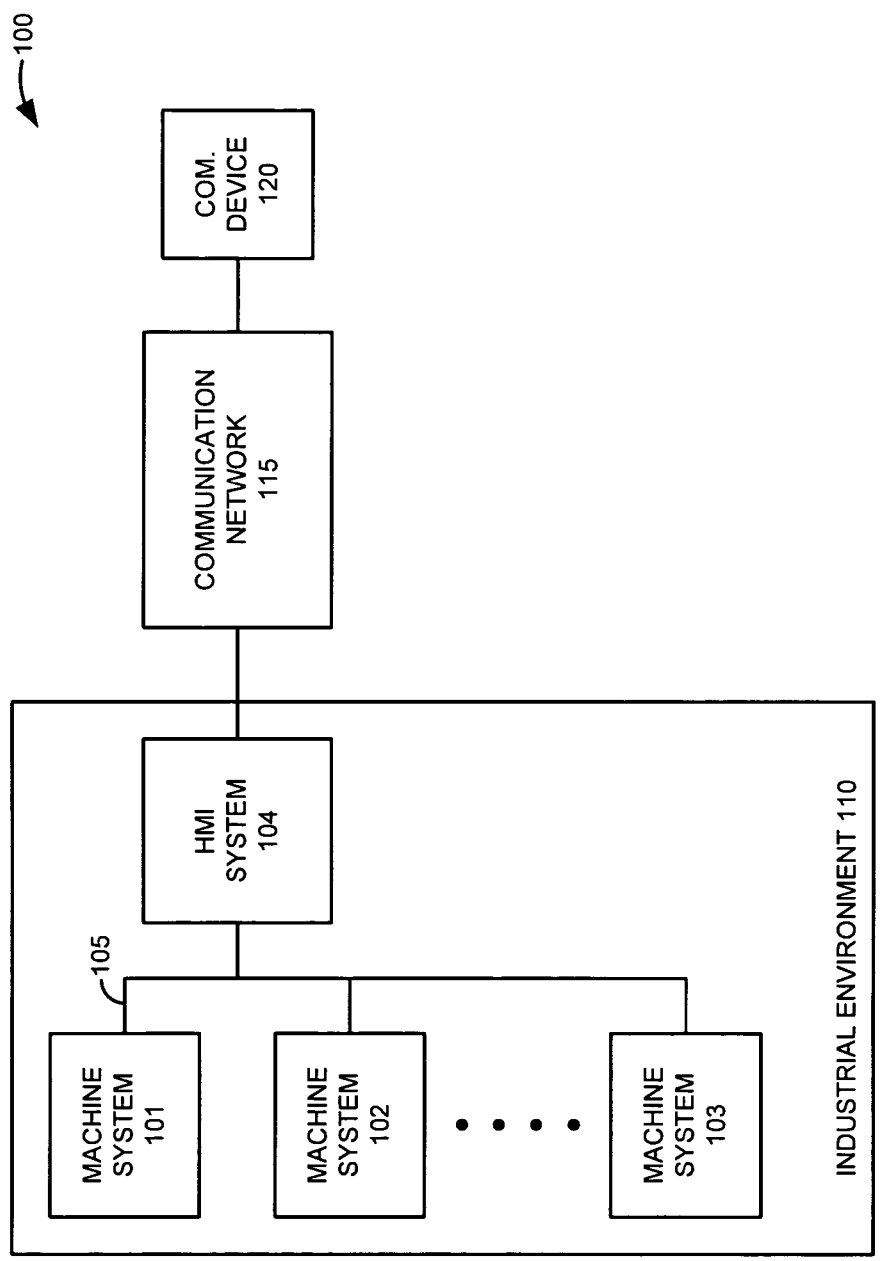
FIG. 1 is a block diagram that illustrates a graphical display system for an HMI system.

FIG. 1 is a block diagram that illustrates graphical display system 100. Graphical display system 100 comprises machine systems 101-103, Human-Machine Interface (HMI) system 104, communication system 105, communication network 115, and communication device 120. Machine systems 101-103 and HMI system 104 communicate over communication system 105. HMI system 104 and communication device 120 communicate over communication network 115. The number of machine systems, communication devices, and communication networks shown on FIG. 1 has been restricted for clarity, but there would typically be many more.

Industrial environment 110 includes machine systems 101-103, HMI system 104, and communication system 105. Industrial environment 110 comprises an automobile manufacturing factory, food processing plant, microprocessor fabrication facility, or some other type of industrial enterprise. Machine systems 101-103 comprise pumps, motors, robots, or some other mechanical apparatus, including their associated control systems. Machine systems 101-103 continually produce status data over time. The status data indicates the current status of machine systems 101-103, such as pressure, temperature, speed, or some other status metric. The status data may comprise dynamic charts, real-time video, or some other graphical content. Machine systems 101-103 continually transfer the status data to HMI system 104 over communication system 105. Communication system 105 could be a local area network, wide area network, or some other communication network—including combinations thereof.

HMI system 104 comprises computer and communication equipment and software. HMI system 104 continually receives the status data from machine systems 101-103. HMI system 104 processes the status data to generate various graphical displays indicating the current and historical status of machine systems 101-103. For example, an HMI graphical display might indicate the pressure of a pump, the speed of a motor, live video of a robot, or some other status metric. HMI system 104 also controls machine systems 101-103. For example, HMI system 104 might turn on a pump, speed-up a motor, stop a robot, or perform some other type of machine control. An example of an HMI system that could be adapted in accord with this description is RSView™ supplied by Rockwell Automation.

Communication network 115 uses the internet protocol, Ethernet, telephony, or some other communication protocol, including combinations thereof. Communication network 115 uses wireless links, metallic links, optical links, or some other communication link, including combinations thereof. Communication network 115 comprises the Internet, a private network, a telephone network, or some other communication network, including combinations thereof.

Communication device 120 comprises a telephone, wireless transceiver, computer, digital assistant, Internet appliance, or some other communication apparatus. Communication device 120 retrieves selected graphical displays from HMI system 104 over communication network 115. Communication device 120 displays the selected graphical displays.

Advantageously, HMI system 104 is configured to provide a visual model of a selected graphical display as rendered by selected communication device 120. In some examples, the model also emulates the operation of selected communication network 115. In some examples, the user may edit the graphical display for communication device 120 operating over communication network 115. When the user subsequently operates communication device 120 to retrieve the graphical display over communication network 115, HMI system 104 transfers the customized version of the graphical display to communication device 120 for display to the user.

Figure 2:
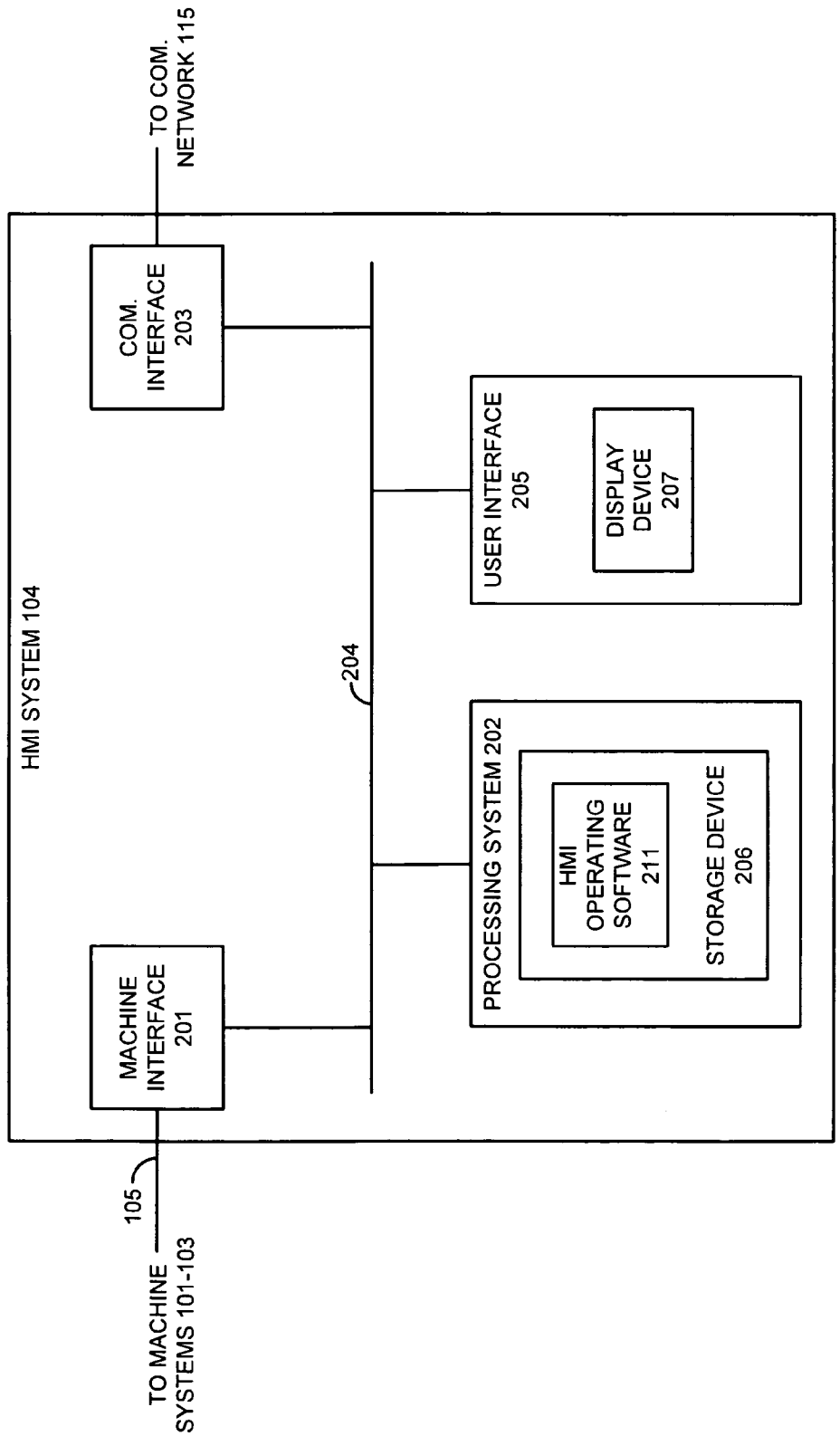
FIG. 2 is a block diagram that illustrates an HMI system.

FIG. 2 is a block diagram that illustrates HMI system 104. HMI system 104 comprises machine interface 201, processing system 202, communication interface 203, communication system 204, and user interface 205. Processing system 202 includes storage device 206. Storage device 206 stores HMI operating software 211. User interface 205 includes display device 207.

Machine interface 201 comprises communication circuitry and equipment that communicates with machine systems 101-103 over communication system 105 to receive machine status data. In addition to storage device 206, processing system 202 includes computer circuitry and equipment that retrieves and executes HMI operating software 211. Communication system 204 comprises a bus, local area network, or some other communication apparatus.

Communication interface 203 receives requests for graphical displays from communication device 120, and under the control of processing system 202, transfers corresponding display data to communication device 120. Communication interface 203 comprises communication circuitry and equipment that communicates with communication devices over communication network 115. Communication interface 203 may also communicate with other communication devices over other networks (not shown).

User interface 205 displays information and graphics to the user under the control of processing system 202, and in response, receives user selections and instructions. User interface 205 comprises a keyboard, mouse, voice recognition interface, touch screen, or some other user device. Display device 207 comprises a liquid crystal display, cathode ray tube display, or some other graphical display mechanism. Storage device 206 comprises a disk, integrated circuit, flash drive, or some other memory device.

HMI operating software 211 comprises an application program, firmware, or some other form of machine-readable processing instructions. HMI operating software 211 may include an operating system, utilities, drivers, networking, and applications. When executed by processing system 202, HMI operating software 211 directs processing system 202 to operate HMI system 104 as described herein. The components of HMI system 104 may be integrated together or distributed among multiple devices.

HMI operating software 211 includes or has access to a visualization data library. The visualization data library identifies several graphical displays, communication devices, and communication networks. The graphical displays comprise display data, and the library includes information that can be used to access the display data. For example, The library could associate a graphical display with a file name or internet protocol link that can be used to retrieve the associated display data. The communication devices each have associated display parameters. The display parameters include the screen size, resolution, refresh rate, color capability, or some other display characteristic. The communication networks each have communication parameters. The communication parameters may include the data transfer rate, jitter, or some other communication characteristic.

Figure 3:
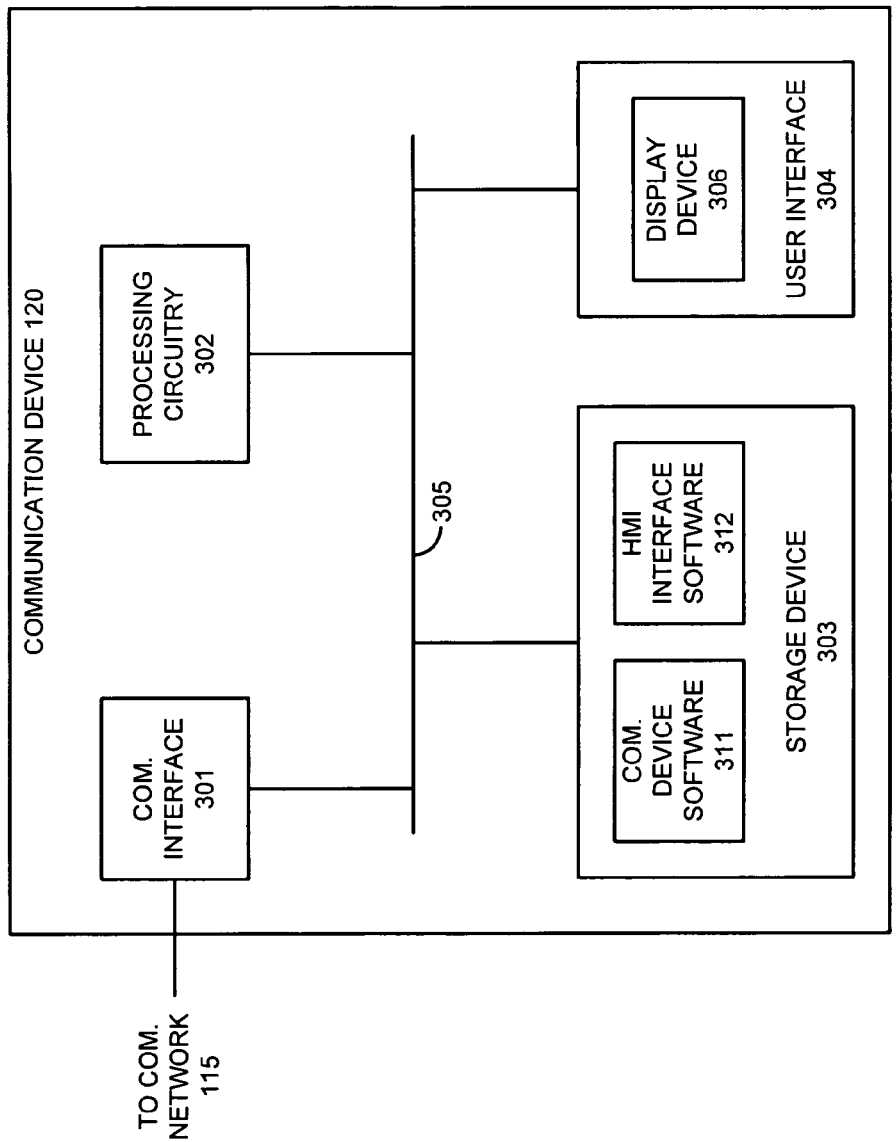
FIG. 3 is a block diagram that illustrates a communication device.

FIG. 3 is a block diagram that illustrates communication device 120. Communication device 120 comprises communication interface 301, processing circuitry 302, storage device 303, user interface 304, and communication system 305. User interface 304 includes display device 306. Storage device 303 stores communication device software 311 and HMI interface software 312.

Communication interface 301 comprises communication circuitry and equipment that communicates with HMI system 104 over communication network 115. Processing circuitry 302 comprises microprocessors and other circuitry that retrieves and executes communication device software 311 and HMI interface software 312. Storage device 303 comprises a disk, integrated circuit, flash drive, or some other memory device. User interface 304 comprises a keyboard, mouse, voice recognition interface, touch screen, or some other user device. User interface 304 may also include a touch pad, wheel, or some other mechanism that allows a user to input a scroll command. Display device 306 comprises a liquid crystal display, cathode ray tube display, or some other graphical display mechanism. Communication system 305 comprises a bus, communication circuitry, or some other communication apparatus.

Communication device software 311 comprises an application program, firmware, or some other form of machine-readable processing instructions. Communication device software 311 may include an operating system, utilities, drivers, networking, and applications. HMI interface software 312 comprises an application to handle interaction with HMI system 104. When executed by processing system 302, communication device software 311 and HMI interface software 312 direct communication device 120 to operate as described herein Advantageously, display device 306 renders a graphical display that has been customized for communication device 120 when operating over communication network 115.

Figure 4:
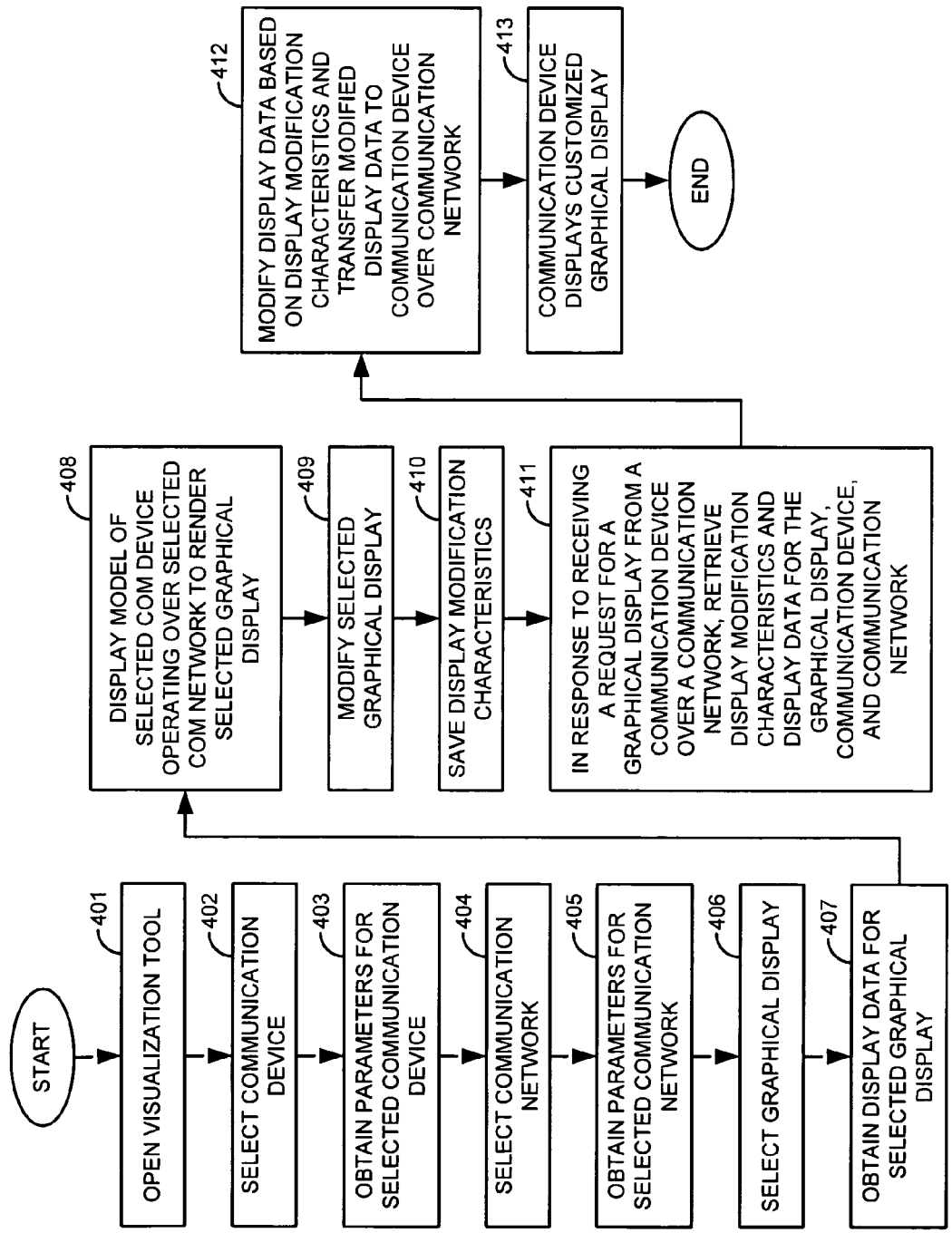
FIG. 4 is a flow diagram that illustrates the operation of an HMI system.

FIG. 4 is a flow diagram that illustrates the operation of HMI system 104. The reference numbers from FIG. 4 are indicated parenthetically below. The user opens a visualization tool within HMI system 104, and HMI system 104 displays a main menu for the visualization tool (401). The user opens a communication device menu within the visualization tool, and HMI system 104 displays the communication device menu. The user selects communication device 120 from the communication device menu (402). HMI system 104 obtains the display parameters for selected communication device 120 (403). The user opens a communication network menu within the visualization tool, and HMI system 104 displays the communication network menu. The user selects communication network 115 from the communication network menu (404). HMI system 104 obtains the communication parameters for selected communication network 115 (405). The user opens a graphical display menu within the visualization tool, and HMI system 104 displays the graphical display menu. The user selects a graphical display from the graphical display menu (406). HMI system 104 obtains display data for the selected graphical display (407).

HMI system 104 processes the display parameters, communication parameters, and display data to display a model of selected communication device 120 operating over selected communication network 115 to render the selected graphical display (408). To provide the model, the display data is passed through a communication network model to a communication device model that displays the graphical display. The communication network model has the data transfer rate and jitter characteristics of selected communication network 115. The communication device model has the screen size, resolution, refresh rate, and color capability of the selected communication device 120. Thus, the user views how communication device 120 would likely render the graphical display while operating in the field.

The user edits the characteristics of the graphical display, and HMI system 104 displays the modified graphical display on the model communication device (409). For example, the user may delete some portions of the display, increase font size, change the video format, or modify some other display characteristic, and then view the graphical display as modified. Once the user is satisfied with the modified graphical display, HMI system 104 saves the display modification characteristics for the modified graphical display in association with selected communication device 120 and selected communication network 115 (410).

Subsequently, the user operates communication device 120 in the field to request the graphical display from HMI system 104 over communication network 115. HMI system 104 identifies the graphical display, communication network 115, and communication device 120, and then retrieves the saved display modification characteristics that are associated with the graphical display, communication device 120, and communication network 115 (411). HMI system 104 then processes the display data based on the modification characteristics to develop customized display data and transfers the customized display data to communication device 120 over communication network 115 (412). Communication device 120 renders the modified graphical display to the user in the field (413).

Figure 5:
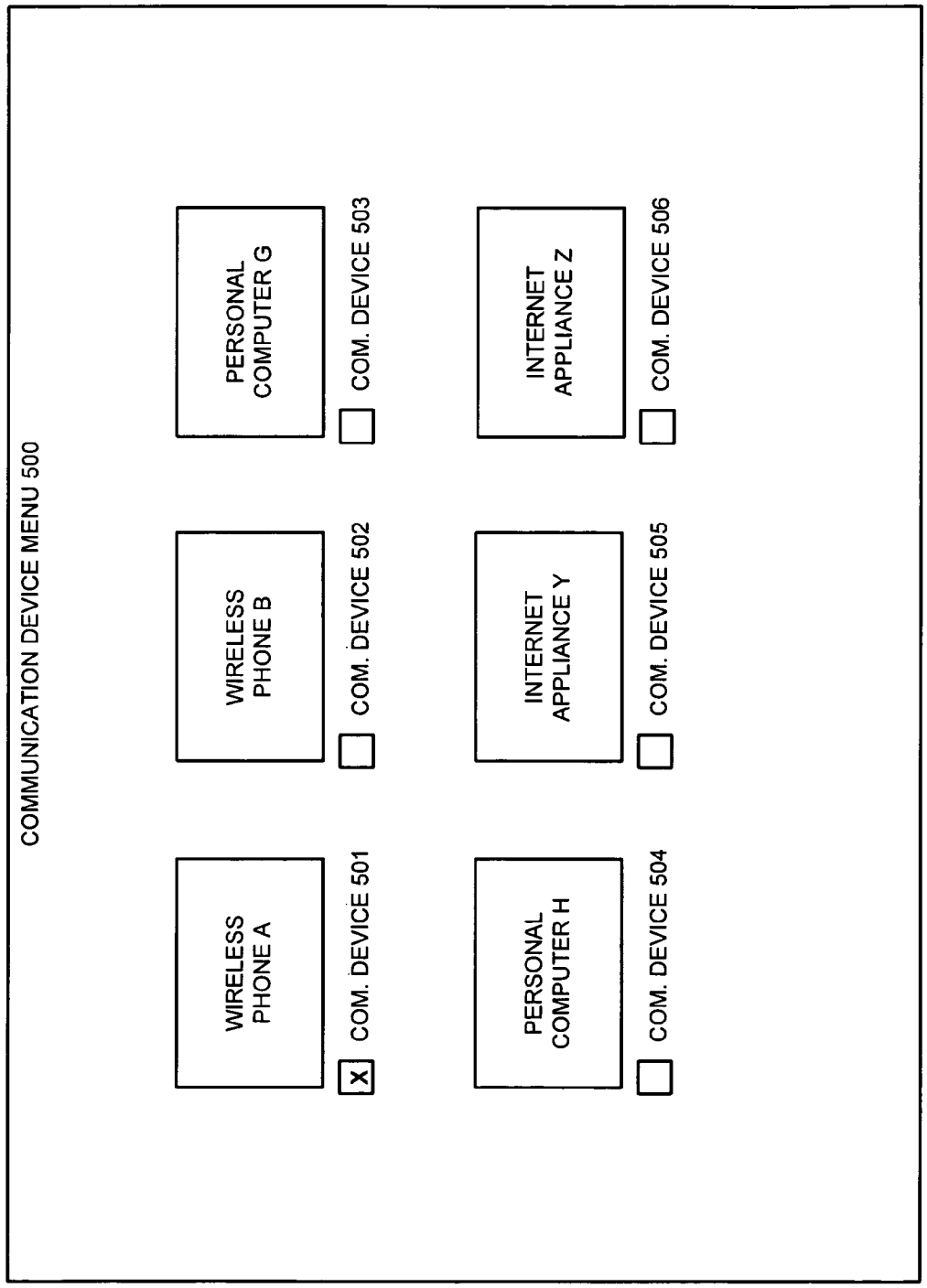
FIG. 5 is a display diagram that illustrates a communication device menu displayed by an HMI system.

FIG. 5 is a display diagram that illustrates communication device menu 500 displayed by HMI system 104. Communication device menu 500 depicts several communication devices 501-506 along with associated selection boxes. In this example, communication device 501 (wireless telephone A) is selected. In response, HMI system 104 obtains display parameters for the selected wireless telephone A.

Figure 6:
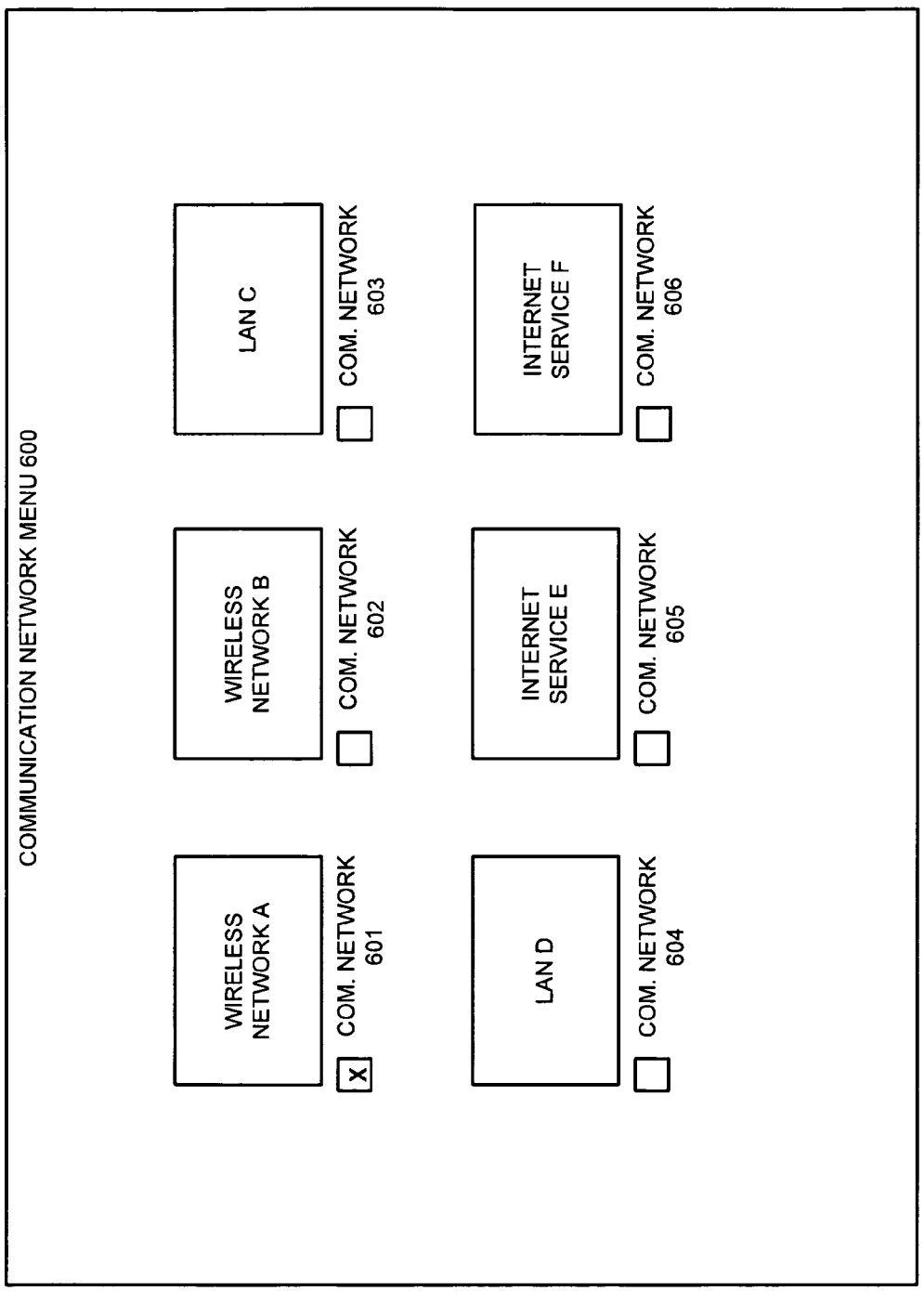
FIG. 6 is a display diagram that illustrates a communication network menu displayed by an HMI system.

FIG. 6 is a display diagram that illustrates communication network menu 600 displayed by HMI system 104. Communication network menu 600 depicts several communication networks 601-606 with associated selection boxes. In this example, communication device 601 (wireless network A) is selected. In response, HMI system 104 obtains communication parameters for the selected wireless network A.

Figure 7:
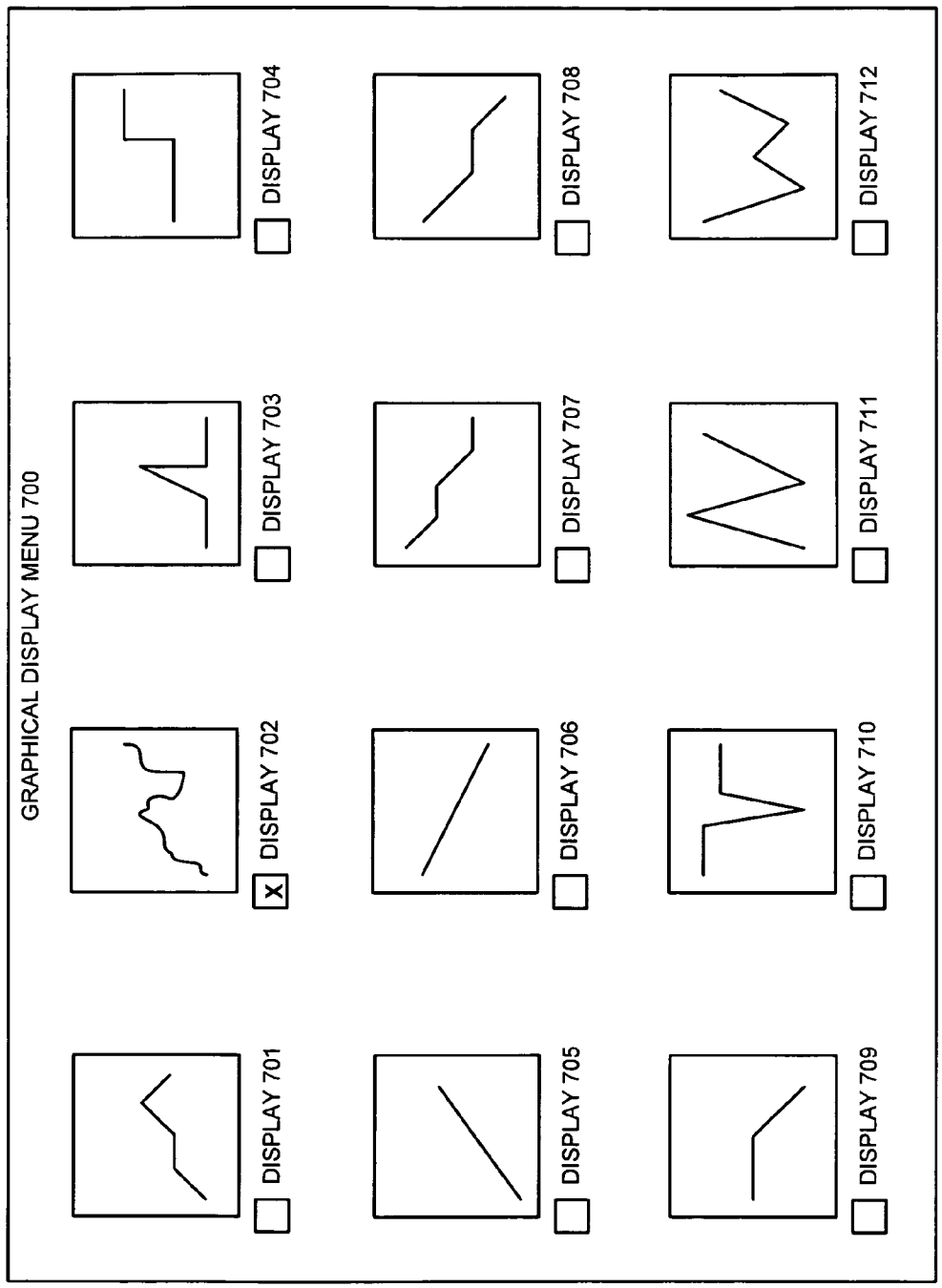
FIG. 7 is a display diagram that illustrates a graphical display menu displayed by an HMI system.

FIG. 7 is a display diagram that illustrates graphical display menu 700 displayed by HMI system 104. Graphical display menu 700 depicts several graphical displays 701-712 with associated selection boxes. In this example, graphical display 702 is selected. In response, HMI system 104 obtains display data for the selected graphical display 702.

Figure 8:
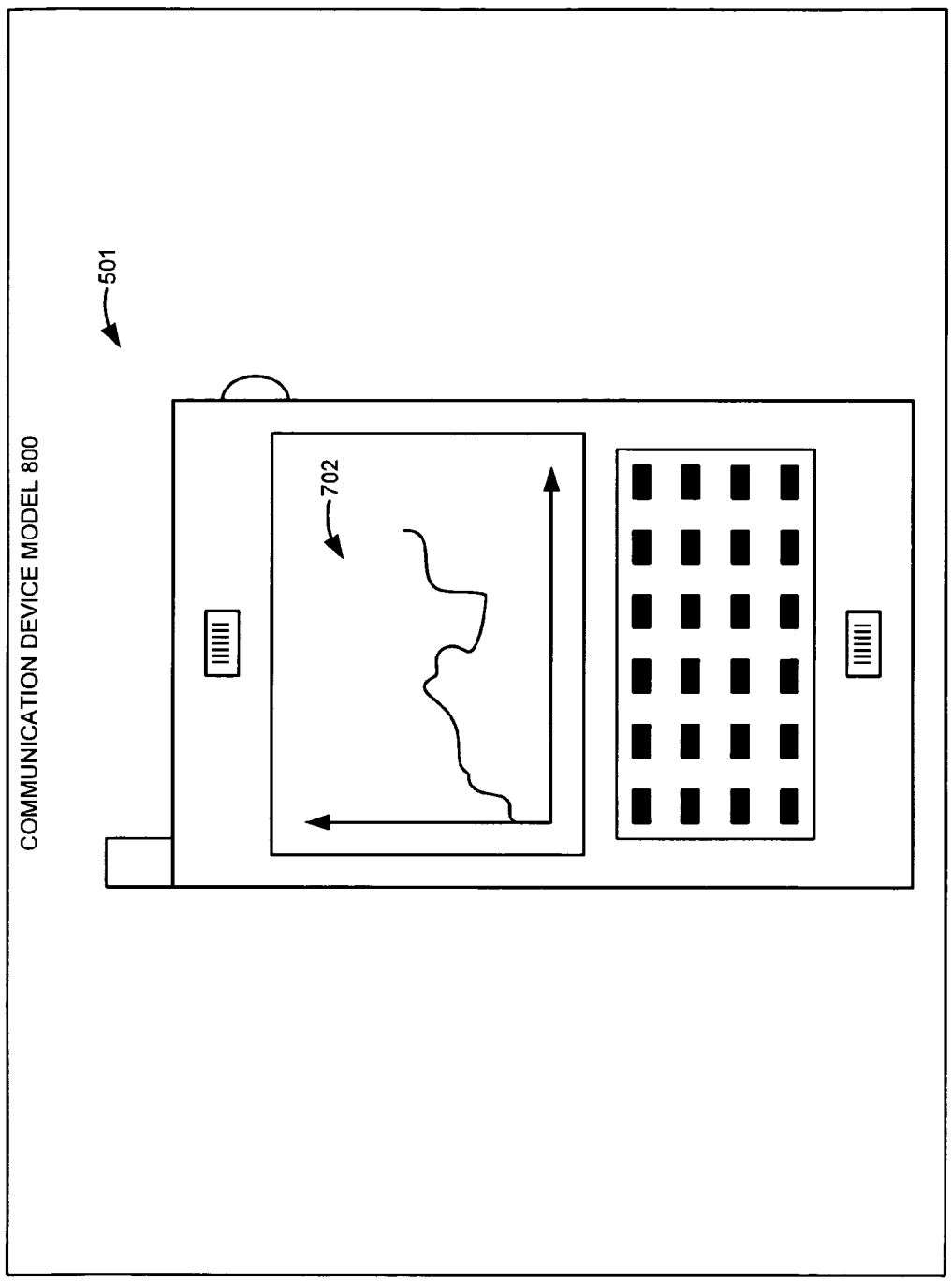
FIG. 8 is a display diagram that illustrates a communication device model displayed by an HMI system.

FIG. 8 is a display diagram that illustrates communication device model 800 displayed by HMI system 104. Communication device model 800 depicts communication device 501 (wireless telephone A) rendering graphical display 702 as if it were operating over communication network 601 (wireless network A). Advantageously, the user may edit the graphical display and view the edits on the model to customize the graphical display for the communication device and network.

Figure 9:
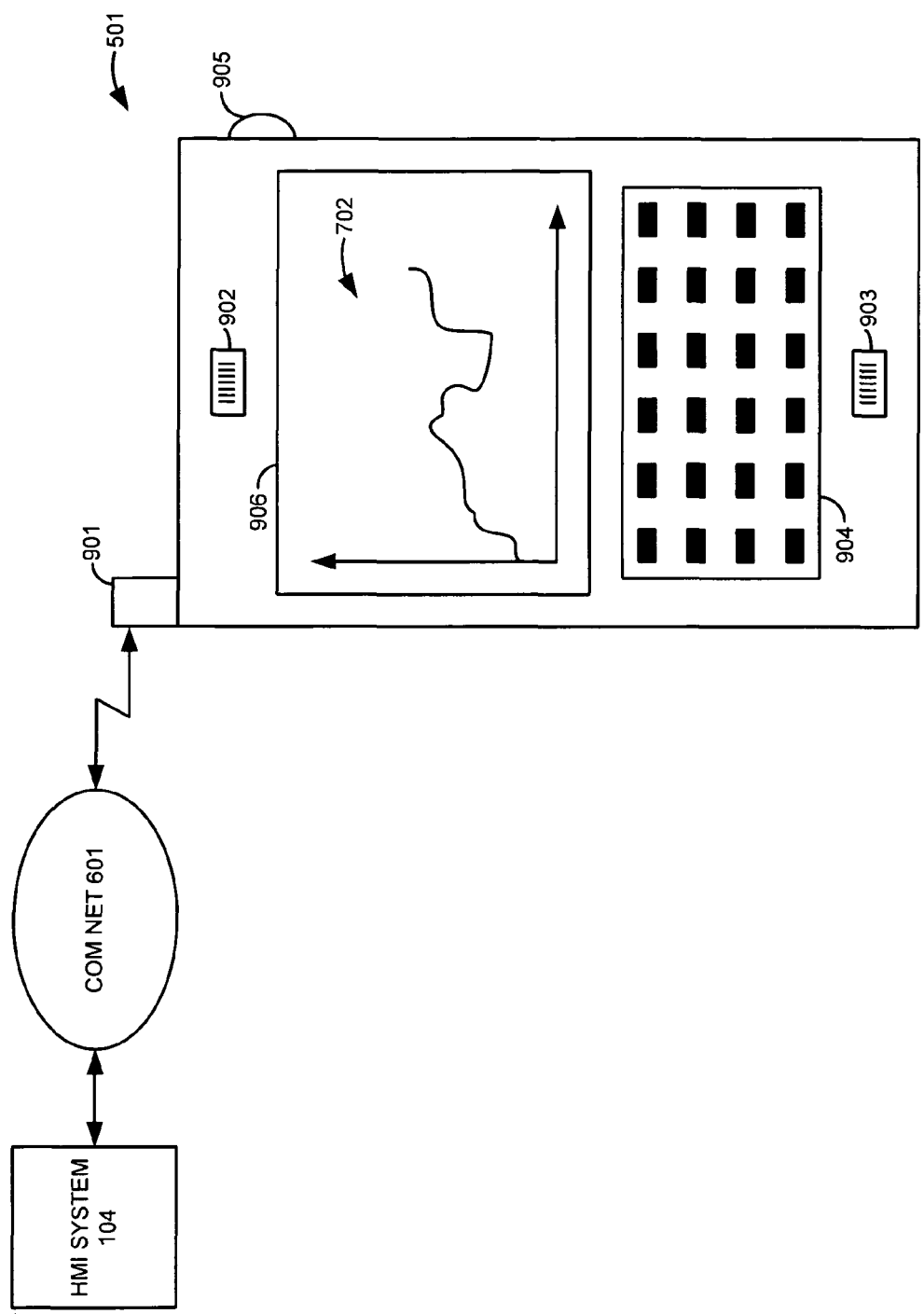
FIG. 9 is a front view of a communication device that provides an HMI display.

FIG. 9 is a front view of communication device 501 operating in the field. Communication device 501 includes antenna 901, speaker 902, microphone 903, key pad 904, scroll wheel 905, and display device 906. Antenna 401 exchanges information with HMI system 104 over communication network 601. The information includes display data for HMI graphical display 702 that is rendered on display device 906. Advantageously, the graphical display may be customized for delivery over communication network 601 and display on display device 906.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Human-Machine Interface (HMI) system to provide a plurality of graphical displays to a plurality of communication devices, the method comprising:
   processing status data from a plurality of machine systems to generate display data for the graphical displays;
   receiving selection information indicating a selected one of the communication devices and a selected one of the graphical displays, and in response, retrieving display parameters for the selected communication device and retrieving the display data for the selected graphical display;
   processing the display data and the display parameters to display a first model of the selected communication device rendering the selected graphical display.

2. The method of claim 1 further comprising:
receiving a display modification characteristic, and in response, modifying the display data based on the display modification characteristic, processing the modified display data and the display parameters to display a second model of the selected communication device rendering the selected graphical display as modified by the display modification characteristic;
saving the display modification characteristic in association with the selected graphical display and the selected communication device; and
receiving a request for the selected graphical display from the selected communication device, and in response, retrieving the display data for the selected graphical display, modifying the display data based on the display modification characteristic, and transferring the modified display data to the selected communication device, wherein the selected communication device processes the modified display data to render the selected graphical display as modified by the display modification characteristic.

3. The method of claim 1 wherein the HMI system provides the graphical displays to the communication devices over a plurality of communication networks, the method further comprising:
receiving additional selection information indicating a selected one of the communication networks, and in response, retrieving communication parameters for the selected communication network and processing the communication parameters to display the first model of the selected communication device operating over the selected communication network to render the selected graphical display.

4. The method of claim 3 further comprising:
receiving a display modification characteristic, and in response, modifying the display data based on the display modification characteristic, processing the modified display data, the display parameters, and the communication parameters to display a second model of the selected communication device operating over the selected communication network to render the selected graphical display as modified by the display modification characteristic;
saving the display modification characteristic in association with the selected graphical display and the selected communication device and the selected communication network; and
receiving a request for the selected graphical display from the selected communication device over the selected communication network, and in response, retrieving the display data for the selected graphical display, modifying the display data based on the display modification characteristic, and transferring the modified display data to the selected communication device over the selected communication network, wherein the selected communication device processes the modified display data to render the selected graphical display as modified by the display modification characteristic.

5. The method of claim 4 wherein the communication parameters comprise a data transfer rate.

6. The method of claim 4 wherein the communication parameters comprise jitter.

7. The method of claim 4 wherein the display parameters comprise a screen size.

8. The method of claim 4 wherein the display parameters comprise a screen resolution.

9. The method of claim 4 wherein the display parameters comprise a refresh rate.

10. The method of claim 4 wherein the display modification characteristic comprises a video format.

11. A Human-Machine Interface (HMI) system to provide a plurality of graphical displays to a plurality of communication devices, the HMI system comprising:
a machine interface configured to process status data from a plurality of machine systems to generate display data for the graphical displays;
a user interface configured to receive selection information indicating a selected one of the communication devices and a selected one of the graphical displays;
a processing system configured to retrieve display parameters for the selected communication device, retrieve the display data for the selected graphical display, process the display data and the display parameters to generate a first model of the selected communication device rendering the selected graphical display;
the user interface further configured to display the first model of the selected communication device rendering the selected graphical display.

12. The HMI system of claim 11 further comprising:
the user interface configured to receive a display modification characteristic;
the processing system configured to modify the display data based on the display modification characteristic, process the modified display data and the display parameters to generate a second model of the selected communication device rendering the selected graphical display as modified by the display modification characteristic;
the user interface configured to display the second model of the selected communication device rendering the selected graphical display as modified by the display modification characteristic;
the processing system configured to save the display modification characteristic in association with the selected graphical display and the selected communication device;
a communication interface configured to receive a request for the selected graphical display from the selected communication device;
the processing system configured to retrieve the display data for the selected graphical display and modify the display data based on the display modification characteristic; and
the communication interface configured to transfer the modified display data to the selected communication device, wherein the selected communication device processes the modified display data to render the selected graphical display as modified by the display modification characteristic.

13. The HMI system of claim 11 wherein the HMI system provides the graphical displays to the communication devices over a plurality of communication networks, the HMI system further comprising:
the user interface further configured to receive additional selection information indicating a selected one of the communication networks
the processing system configured to retrieve communication parameters for the selected communication network and process the communication parameters to generate the first model of the selected communication device operating over the selected communication network to render the selected graphical display.

14. The HMI system of claim 13 further comprising:
the user interface configured to receive a display modification characteristic;
the processing system configured to modify the display data based on the display modification characteristic, process the modified display data, the display parameters, and the communication parameters to generate a second model of the selected communication device operating over the selected communication network to render the selected graphical display as modified by the display modification characteristic;
the user interface configured to display the second model of the selected communication device operating over the selected communication network to render the selected graphical display as modified by the display modification characteristic;
the processing system configured to save the display modification characteristic in association with the selected graphical display and the selected communication device and the selected communication network;
a communication interface configured to receive a request for the selected graphical display from the selected communication device over the selected communication network;
the processing system configured to retrieve the display data for the selected graphical display and modify the display data based on the display modification characteristic; and
the communication interface configured to transfer the modified display data to the selected communication device over the selected communication network, wherein the selected communication device processes the modified display data to render the selected graphical display as modified by the display modification characteristic.

15. The HMI system of claim 14 wherein the communication parameters comprise a data transfer rate.

16. The HMI system of claim 14 wherein the communication parameters comprise jitter.

17. The HMI system of claim 14 wherein the display parameters comprise a screen size.

18. The HMI system of claim 14 wherein the display parameters comprise a screen resolution.

19. The HMI system of claim 14 wherein the display parameters comprise a refresh rate.

20. The HMI system of claim 14 wherein the display modification characteristic comprises a video format.

21. A non-transitory software product for a Human-Machine Interface (HMI) system to provide a plurality of graphical displays to a plurality of communication devices, the software product comprising:
HMI operating software configured to direct the HMI system to process status data from a plurality of machine systems to generate display data for the graphical displays, receive selection information indicating a selected one of the communication devices and a selected one of the graphical displays, retrieve display parameters for the selected communication device, retrieve the display data for the selected graphical display, process the display data and the display parameters to display a first model of the selected communication device rendering the selected graphical display; and
a non-transitory storage device that stores the HMI operating software.

22. The non-transitory software product of claim 21 wherein the HMI operating software is further configured to direct the HMI system to receive a display modification characteristic, modify the display data based on the display modification characteristic, process the modified display data and the display parameters to display a second model of the selected communication device rendering the selected graphical display as modified by the display modification characteristic, save the display modification characteristic in association with the selected graphical display and the selected communication device, receive a request for the selected graphical display from the selected communication device, retrieve the display data for the selected graphical display, modify the display data based on the display modification characteristic, and transfer the modified display data to the selected communication device, wherein the selected communication device processes the modified display data to render the selected graphical display as modified by the display modification characteristic.

23. The non-transitory software product of claim 21 for the HMI system to provide the graphical displays to the communication devices over a plurality of communication networks, wherein the HMI operating software is further configured to direct the HMI system to receive additional selection information indicating a selected one of the communication networks, retrieve communication parameters for the selected communication network, process the communication parameters to display the first model of the selected communication device operating over the selected communication network to render the selected graphical display.

24. The non-transitory software product of claim 23 wherein the HMI operating software is further configured to direct the HMI system to receive a display modification characteristic, modify the display data based on the display modification characteristic, process the modified display data, the display parameters, and the communication parameters to display a second model of the selected communication device operating over the selected communication network to render the selected graphical display as modified by the display modification characteristic, save the display modification characteristic in association with the selected graphical display, the selected communication device, and the selected communication network, receive a request for the selected graphical display from the selected communication device over the selected communication network, retrieve the display data for the selected graphical display, modify the display data based on the display modification characteristic, and transfer the modified display data to the selected communication device over the selected communication network, wherein the selected communication device processes the modified display data to render the selected graphical display as modified by the display modification characteristic.

25. The non-transitory software product of claim 24 wherein the communication parameters comprise a data transfer rate and the display parameters comprise a screen size and screen resolution.

* * * * *